April 15, 1924.                                                          1,490,266
                    J. B. GRAVELLE
        LIFTING AND GROUND GRIPPING DEVICE FOR VEHICLE WHEELS
                    Filed Nov. 10, 1922
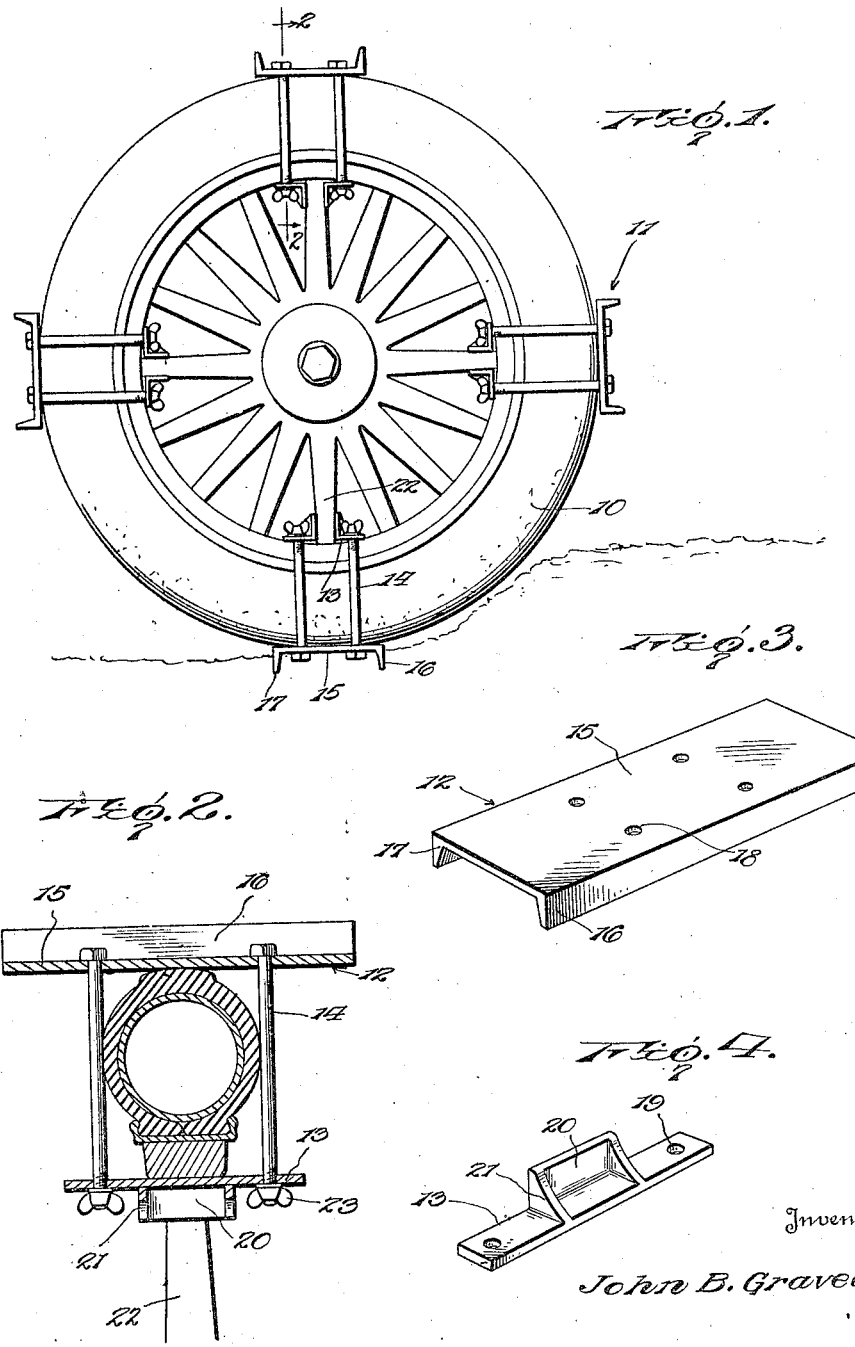

Patented Apr. 15, 1924.

1,490,266

UNITED STATES PATENT OFFICE.

JOHN B. GRAVELLE, OF ASBURY PARK, NEW JERSEY.

LIFTING AND GROUND-GRIPPING DEVICE FOR VEHICLE WHEELS.

Application filed November 10, 1922. Serial No. 600,102.

*To all whom it may concern:*

Be it known that I, JOHN B. GRAVELLE, a citizen of the United States, residing at Asbury Park, in the county of Monmouth and State of New Jersey, have invented certain new and useful Improvements in Lifting and Ground-Gripping Devices for Vehicle Wheels, of which the following is a specification.

The present invention relates to a lifting and ground gripping device for vehicle wheels in general, but more particularly for automobile wheels.

One object of the invention is to provide easily attachable and detachable grippers for the wheels, and which grippers are not apt to unnecessarily wear or damage pneumatic or other tires or the parts thereof with which they may come in contact.

Another object of the invention is to so construct the device that it may be applied to wheels of different construction and different size without any material change.

In the accompanying drawing, one embodiment of the invention is illustrated, and Figure 1 shows a side elevation of the wheel with the grippers in position;

Figure 2 shows a transverse section along line 2—2 of Figure 1, and in larger scale;

Figure 3 shows a perspective view of the shoe plate, and

Figure 4 shows a perspective view of a securing strap.

In the drawing, reference numeral 10 represents a vehicle wheel, here shown as a wheel with a pneumatic tire. It is evident that any number of grippers 11 may be applied to each wheel but four grippers are here shown attached to the wheel.

The gripper or lifter 11 consists of three principal parts, namely: a shoe plate 12, securing straps 13 and bolts with wing nuts 14.

As best seen in Figure 3, the shoe plate is channel-shaped with a rectangular body portion 15, having longitudinal side flanges 16, which are tapered in the direction of the body portion and made heaviest at the root, as at 17. The body portion 15 has a length approximately equal to twice the width of the tire and is provided with a number of apertures 18 for the clamping bolts 14. These apertures are spaced apart in the length direction of the shoe plate 12 to permit the bolts to pass, without contacting with the rubber tire. When the nuts are drawn up on the bolts, the tire will, however, expand laterally to contact with the bolts as seen in Figure 2.

The securing straps 13 are of sufficient length to permit the bolts 14 to engage in suitable apertures 19 furnished therein. The securing straps are of a cross section that will permit them to seat on the inner periphery of the wheel felly while a web 20, rising from the body portion of the strap and reinforced by side braces 21, may rest against one of the wheel spokes 22, see Figure 1. The bolts 14 are provided with wing nuts 23 threaded on the ends of the bolts adapted to tighten the securing straps 13 and the shoe plate 12 together. For each shoe plate 12 there are two securing straps 13, as seen in Figures 1 and 2.

It will now be evident that with this lifting and ground gripping device attached to a wheel a firm hold may be obtained on the ground and as the device is symmetrical around the radial plane, the flange 16 will take a firm hold on the ground in whatever direction the wheel is turning, either forward or backward.

The purpose of the webs 20 is to protect the spokes 22 from being damaged or cut by the securing straps or plates 13 when in position.

As all the parts of which the lifting and ground gripping device consist are very simple in shape and as no machining is necessary beyond drilling the bolt holes, the device may be manufactured at a very low cost and may, consequently be within reach of a great number of customers.

Furthermore, as there are no sharp edges coming in contact with the rubber tire, the device is not liable to injure the latter or wear it away as rapidly as is the case with other similar devices, such as chains and the like. Moreover, the gripping and lifting qualities of this device are far superior to those of other devices, as the flanges 16 will be imbedded in the ground to obtain a very firm hold thereof; while at the same time these flanges are of sufficient strength not to break off easily.

Having thus described the invention, what is claimed as new is:

1. A lifting and ground gripping device for vehicle wheels comprising a shoe member having gripping elements and means for securing the shoe member to the wheel tire, said securing means including a strap engaging in transverse direction with the wheel felly and bolts connecting the strap to said shoe member, said strap having a braced web adapted to rest against a wheel spoke.

2. A lifting and ground gripping device for vehicle wheels comprising a straight shoe member and means for securing said member to the wheel tire, said shoe member being of channel construction having projecting flanges perpendicularly arranged to its body portion along its edges and adapted to grip the ground, said flanges extending along the entire length of said member transversely across the wheel rim and having a length of approximately twice the width thereof.

In testimony whereof I affix my signature.

JOHN B. GRAVELLE. [L. S.]